Figure 1:
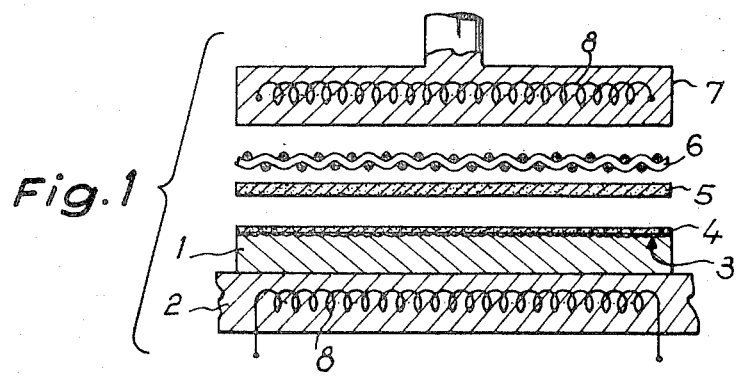

United States Patent

[11] 3,616,188

[72] Inventor Raymond Mancel
 Paris, France
[21] Appl. No. 870,914
[22] Filed Aug. 27, 1969
[23] Division of Ser. No. 449,139,
 Apr. 19, 1965, Pat. No. 3,501,360
[45] Patented Oct. 26, 1971
[73] Assignee International Telephone and Telegraph Corporation
 New York, N.Y.
[32] Priority Apr. 17, 1964
[33] France
[31] PV 971248

[54] DRY FRICTION MEMBERS
 4 Claims, 5 Drawing Figs.
[52] U.S. Cl. .................................................. 161/189,
 117/8, 117/132 CF, 161/164, 161/216, 308/238,
 308/239
[51] Int. Cl. ..................................................... B32b 3/00,
 B32b 15/08, B32b 27/04
[50] Field of Search............................................ 161/189,
 182, 216, 79, 82, 84, 88, 92, 95, 164, 213; 117/8,
 127, 132, 161 UZ, 161 CF; 308/238, 239;
 264/112, 127; 156/228, 279, 153; 287/90 R

[56] References Cited
 UNITED STATES PATENTS
2,989,433 6/1961 Yuan.............................. 156/313
3,108,018 10/1963 Lewis............................. 117/161
3,174,895 3/1965 Gibson et al.................... 161/259
3,206,344 9/1965 Elkins............................. 156/86
3,239,403 3/1966 Williams et al. ............... 156/275
3,464,845 9/1969 Osborn et al. ................. 161/189
3,464,882 9/1969 Morton .......................... 161/189 X Primary Examiner—Harold Ansher
Attorney—Bacon & Thomas ABSTRACT: The dry friction member has a friction surface and consists of a metal support having a roughened surface, a graphite tissue impregnated with a copolymer of tetrafluoroethylene and hexafluoropropene which adheres to said roughened surface wherein the graphite tissue is in intimate contact with the roughened surface on one face of said impregnated graphite tissue and presents on the other face a plurality of noncoated areas interspersed with spots of the copolymer.

PATENTED OCT 26 1971 3,616,188

INVENTOR
RAYMOND MANCEL
BY
Bacon & Thomas
ATTORNEYS

DRY FRICTION MEMBERS

This is a division of application Ser. No. 449,139, filed Apr. 19, 1965 now U.S. Pat. No. 3,501,360. L The present invention relates to the manufacture of dry friction members and to the products obtained by this method, the member comprising a metal support, a sheet of a thermoplastic material and a filler material.

Dry friction members are used more and more in all industrial fields where machines and mechanisms are used which exhibit a relative friction between two movable members thereof and which do not permit lubrication by means of liquid or grease, such as for example, certain bearings for shafts, sealed fittings for pumps or jacks, members necessitating a rotary seal such as rotary joints, fittings for fluid distributors and so on.

The use of polytetrafluoroethylene, known under the trademark of Teflon (P.T.F.E.) is already known as a dry lubricating material. However, the characteristics of thermal and electric conductivity do not permit it to be used alone in dry friction members. This is why Teflon has been loaded with metal particles which are intended to transmit heat or electrostatic charges, generally produced during the relative friction, to the Teflon support.

However, such metal particles embedded in the layer of Teflon are practically thermally and electrically insulated from one another, so that for example in a bearing provided with such a friction member, there are always points which overheat because the heat produced by the rotation of the shaft cannot be uniformly distributed throughout the bearing. On the other hand, metal particles may be pulled away from the Teflon layer and may cause friction in the shaft. In order to avoid these disadvantages, it has already been proposed to provide a thicker layer of Teflon so that the metal particles may be well embedded therein. But this further increases the thermal and electric resistance so that the Teflon rapidly heats up and begins to flow under the effect of the load of the shaft, which then produces an inadmissable clearance between the bearing and the shaft. Moreover, the method of manufacturing such dry friction members is very difficult, costly and complicated. In order to obtain acceptable results, the grain size of the particles must be properly suited to each particular use. Then it is necessary to make sure that these particles are uniformly distributed in the bulk of the Teflon. Other difficulties also arise, which are too numerous to mention here. It is an object of the present invention to obviate or minimize the above-mentioned disadvantages. A further object of the invention is a method of manufacturing a dry friction member which has a very good thermal and electrical conductivity, and which can resist the continuously applied shocks and heavy loads.

Accordingly, the invention consists in a method of manufacturing a dry friction member, said method comprising the steps of taking a metal support member, roughening one surface of said support member, applying to said roughened surface a layer of a copolymer of tetrafluoroethylene and of hexafluoroporpylene, known under the trademark of Teflon FEP, locating a tissue of graphite over said layer of Teflon FEP to form a multilayer member applying heat and pressure to said multilayer member to force said graphite tissue into the Teflon FEP and thus impregnate the tissue with said Teflon FEP, also by applying pressure bringing parts of said graphite tissue into contact with said roughened surface of said metal support member, cooling said multilayer member, and lightly machining the exposed surface of said graphite tissue to remove any Teflon FEP appearing on said exposed surface as a result of said impregnation.

In one embodiment of the invention, one of the surfaces of the metal support is subjected to a sandblasting operation so as to obtain at least a microrugosity of said surface, and a very thin layer of Teflon FEP in dispersion in distilled water or in other volatile solutions is deposited by means of a spray gun on the surface thus treated, the solution is then evaporated so as to obtain a microlayer of Teflon FEP, then a sheet of Teflon FEP is deposited on the metal support provided with the microlayer of Teflon FEP and a graphite tissue is placed on the sheet of Teflon FEP. This assembly of metal support, a microlayer, and the tissue is brought to a temperature which is slightly greater than the melting point of the Teflon FEP and, while this temperature is maintained, a suitable pressure is applied to the graphite tissue so as completely to impregnate the graphite tissue by the Teflon FEP and to bring the graphite tissue into contact with the metal surface of the support, then after this assembly has cooled, a small thickness of the graphite tissue is removed by machining in order to eliminate any covering of the tissue by the Teflon FEP.

In another embodiment of the invention, having subjected the metal support to a sandblasting operation to give one of its surfaces at least a microrugosity, firstly a graphite tissue, then a sheet of Teflon FEP is deposited on the treated surface, this assembly is then brought to a temperature which is slightly greater than the melting point of the Teflon FEP and, while this temperature is maintained, this assembly is then subjected to a suitable pressure so as to cause the Teflon FEP completely to penetrate into the pores of the graphite tissue and so as to bring the graphite tissue as well as the Teflon FEP into contact with the treated surface of the metal support. After this assembly has cooled, a small thickness of the graphite tissue is removed by machining in order to eliminate a possible covering of the tissue by the Teflon FEP.

The temperature to which the assembly constituting the dry friction member is brought, is preferably between 290° and 320° C.

The pressure to which said assembly is subjected is preferably between 50 and 500 kg./cm.$^2$.

The quantity of the Teflon FEP is selected as a function of the volume of the pores of the graphite tissue so that the volume of the Teflon FEP is always slightly greater than that of the pores of the graphite tissue in the noncompressed state.

The dry friction member obtained by practicing any one of the above described methods includes a metal support, one of the surfaces of which presents at least a microrugosity, a graphite tissue and a layer of Teflon FEP.

One of the faces of the graphite tissue is in intimate contact with the treated roughened surface of the metal support at least in the areas of the mesh of the tissue, while the other or opposite face of the tissue is uncoated in the outermost exposed areas of the mesh of the tissue.

The Teflon FEP fills only the pores of the graphite tissue, adheres only at distributed points to the treated surface of the metal support, and holds the graphite tissue applied against said surface.

The total thickness of graphite tissue applied to the metal support is of the order of two-tenths mm.

The metal support may be in the form of a plate, belt or sheet.

Figure 2:
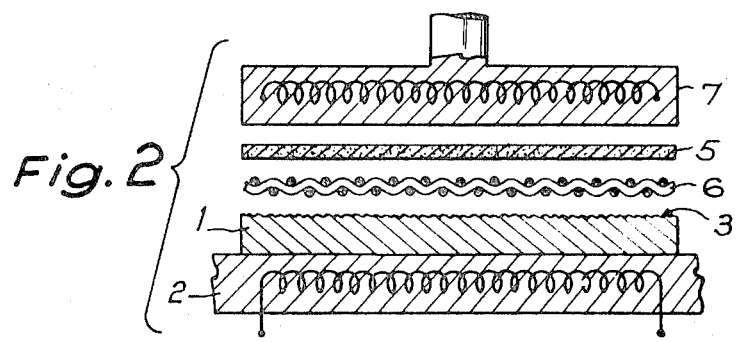
Figure 3:
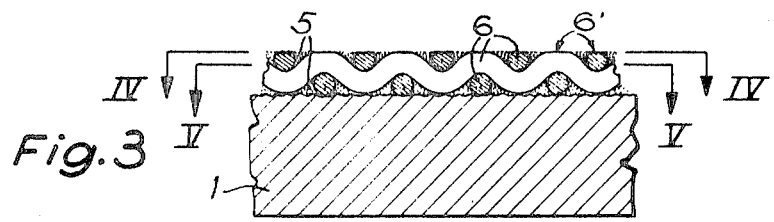
Figure 4:
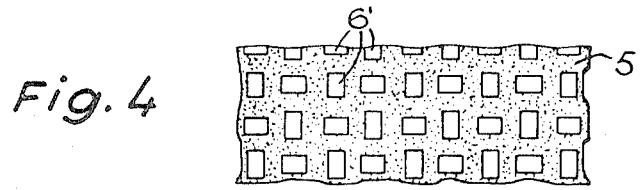
Figure 5:
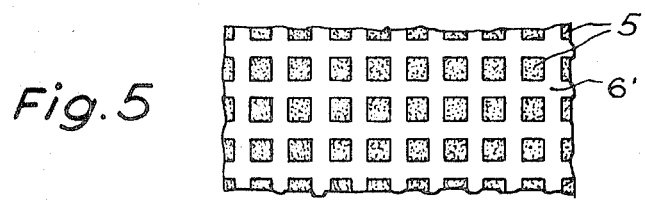

In order that the invention may be more clearly understood, reference will now be made to the accompanying drawings which show two embodiments of the method of manufacture and of the dry friction member thus obtained, by way of example and in which:

FIG. 1 shows schematically in section, the different phases of operation of a first embodiment of the method, FIG. 2 similarly shows the different phases of operating a second embodiment, FIG. 3 shows a vertical section through a dry friction member obtained by said method, FIG. 4 shows a plan view of one part of the dry friction member along IV—IV of FIG. 3 and, FIG. 5 shows a section in plan view of the member along the line V—V of FIG. 3.

Referring now to the drawings in FIG. 1, a metal support 1, such as a plate, belt or sheet is shown which is placed on a work table 2 which may be heated. The surface 3 of the metal support 1 has been previously treated by sandblasting, and chemical or electrolytic cleaning, so as to give it at least a microrugosity. This microrugosity surface 3 is then covered, for example by means of a spray gun, with a very thin layer of Teflon FEP in dispersion in distilled water or in other volatile products so that after the solution has evaporated, a microlayer of Teflon FEP is obtained having a thickness of the order of one one-hundredth of a millimeter.

The Teflon FEP is a copolymer of tetrafluorethylene and of hexafluoropropylene and has all the chemical, electrical and thermal properties of the tetrafluorethylene resins (TFE) as well as the characteristic physical properties of the compounds of chemical structure saturated with fluorine.

On this microlayer 4 is deposited a film 5 of Teflon FEP having a thickness of two-tenths to six-tenths of a millimeter. Then a graphite tissue 6 is placed above the film 5 which tissue has for example a thickness between twenty one-hundredths and fifty one-hundredths of a millimeter and preferably between twenty-five one-hundredths and forty one-hundredths of a millimeter. This tissue is very supple and pliable and is a very good conductor of electricity and heat. This stacked assembly, 1, 3, 4, 5, 6 is heated to a temperature which is slightly greater than the melting point of the Teflon FEP which is of the order of 290° C. When the Teflon FEP has been brought to a temperature preferably between 290° and 320° C., this assembly 3 to 6 is compressed by means of a pressure platen 7. Heating means 8 may be incorporated in the platen and/or in the work table 2, and if desired the table 2 and the platen 7 may be especially shaped so as to form a mold.

The pressure of the platen 7 exerted on the tissue 6, the film 5, the microlayer 4 and the support 1 is preferably at least 5,000 kg./cm.² Because Teflon FEP is in a molten state or at least in a pastelike state at the above-mentioned temperature, the graphite tissue 6 may come directly into contact with the rough metal surface 3 under the effect of the pressure applied by the platen 7. The Teflon FEP of the film 5 and that of the microlayer 4 also come onto contact together and penetrate into the pores of the graphite tissue 6. The total quantity of the Teflon FEP utilized is determined so that, during the compression operation, the Teflon FEP completely fills the pores of the graphite tissue 6 without preventing the latter from coming into direct intimate contact with the rough surface 3 of the support 1. Any excess of Teflon FEP escapes over the side edges of the support 1. While the Teflon FEP is penetrating into the pores of the tissue 6, the air which is previously located therein is driven upwards.

After this assembly 1,3,5,4,6 has cooled under pressure, the surface of the friction member thus obtained is lightly machined in order to remove any covering of Teflon FEP on the upper face of the graphite tissue 6 and in order to exhibit relatively large graphite areas on this face.

According to a second embodiment of the method, shown diagrammatically in FIG. 2, a graphite tissue 6 is directly deposited on the microrugose or rough surface 3 of the metal support 1. Then, the film 5 of Teflon FEP is placed above the graphite tissue 6. This assembly is then brought to a suitable temperature of the order of 290° to 320° C. and compressed by means of the platen 7. The air contained in the pores of the tissue 6 escapes along the rough surface 3 while the softened Teflon FEP, penetrating through the pores of the graphite tissue 6 then comes into contact with the surface 3. It may be advantageous to effect the heating and compression operations in an enclosure where there is a suitable vacuum. In this case, the amount of the utilized Teflon FEP is determined as a function of the volume of the pores of the tissue 6, the weft and warp threads also come into direct contact with the rough surface 3, where, after the assembly 1,5,6 has cooled under pressure, they are firmly held by the Teflon FEP anchored on the one hand in the hollows of the surface 3 and on the other hand in the pores of the tissue 6.

The removal by machining of a very thin layer of the surface from the friction member thus effected shows relatively large multiple areas of graphite tissue 6.

As will be apparent from FIG. 3 showing a partial section on a larger scale of the dry friction member thus produced, there exists numerous points or areas of direct contact between the tissue 6 and the metal support 1. The bulk 5 of Teflon FEP is then located in the interstices between the weft and warp threads of the tissue 6.

According to the thickness of the layer removed by the machining from the surface of the friction member, the patterns shown in FIGS. 4 and 5 are obtained.

In FIG. 4, only the threads of the tissue 6 and the bulk of Teflon FEP are located in the plane IV—IV of FIG. 3. However, the different areas 6' of the tissue 6 are always connected below the bulk 5 of Teflon FEP to the adjacent areas. When the surface of the friction member is machined even more, for example up to the plane V—V of FIG. 3, the pattern of the surface of said friction member presents the form of a grid constituted by the graphite threads 6' and in the interstices of which is located the bulk 5 of Teflon FEP.

It is therefore clear that on the surface of the friction member there exists a large number of areas which the graphite lightly touches, so that the heat or electric charges produced on this surface by the relative displacement of any member with respect to the friction member may easily be removed from this surface and may be transmitted to the metal support 1 which is connected to cooling elements.

It may thus be seen that by practicing the above-disclosed methods dry friction members may be manufactured, which, in addition to their lubricating properties have very high and almost isotropic electrical and thermal conductivities.

If for example a friction member, manufactured as described above, is used in a plain bearing, the load applied on the bearing may be considerably increased compared with loads applicable up to the present time, when for example a friction member composed of Teflon loaded with metal particles is used. It is known that the friction area between the surface of the friction member and the shaft must also be as close as possible to the metal support. However, the minimum admissable thickness of the layer of Teflon loaded with metal particles is of the order of five-tenths of a millimeter. This layer thickness is very difficult to produce by known methods, and, moreover, the particles of the Teflon layer are very frequently broken off and the latter is extruded.

When a friction member manufactured in accordance with the methods disclosed above is used, friction layers may easily be produced, the thickness of which is smaller than two-tenths of a millimeter. This result is perfectly comprehensible, when it is known that the initial thickness of the graphite tissue utilized is for example 0.25 millimeter. After the surface of this tissue is compressed and machined in the course of the previously described method of manufacture, a layer comprised of the graphite tissue impregnated with Teflon FEP is easily produced, the total thickness of which impregnated tissue is less than 0.20 millimeter. Moreover, even at high temperatures, more precisely, higher than the melting point of the Teflon FEP, the latter cannot flow since it is retained in the pores of the graphite tissue. But, in general, even in very severe operating conditions, these temperatures are not reached due to the good conductivity of the graphite tissue because of its numerous areas of contact with the metal support.

By way of example, several operational conditions will be described to which one of the friction members, made as disclosed above, has been subjected.

A shaft bearing was made up and provided with a friction member, made as disclosed above, and had an internal diameter of 30 mm. The speed of rotation of the shaft was 30,000 r.p.m., or a peripheral speed of 47.20 m./sec. The load on the shaft and thus on the bearing, was 1 kg./cm.² After 300 hours of continuous service, the temperature of the bearing rose only by 10° C. with respect to the ambient temperature. An examination by microscope of the friction member did not show any deterioration.

Of course, the application of the above-disclosed friction members is not limited at all to plain bearings. On the contrary, they may find many uses in all fields in industry, particularly in those mentioned in the introduction hereto, and, more generally, in all cases where there is friction between two members. It will be clear that the specific details herein referred to may be varied in many respects without departing from the scope of the invention as defined by the appended claim.

I claim:

1. A dry friction member having a friction surface and consisting of a metal support having a roughened surface, a graphite tissue impregnated with a copolymer of tetrafluoroethylene and hexafluoropropene which adheres to said roughened surface wherein the graphite tissue is in intimate contact with the roughened surface on one face of said impregnated graphite tissue and presents on the opposite face a plurality of noncoated graphite tissue areas wherein the outermost exposed face of said graphite tissue is completely free of the impregnating copolymer coating.

2. A dry friction member according to claim 1, wherein the copolymer appears only in spots on the graphite tissue on the surface remote from the metal support, the said surface constituting part of the friction surface of said member.

3. A dry friction member according to claim 1, wherein the copolymer fills only the pores of said graphite tissue, adhering only in spots to the roughened surface of said metal support member and holding the graphite tissue applied against said surface.

4. A dry friction member according to claim 1, wherein the total thickness of said impregnated graphite tissue is less than 0.2 millimeters.